(12) United States Patent
Kasher

(10) Patent No.: US 8,369,351 B2
(45) Date of Patent: Feb. 5, 2013

(54) METHOD AND APPARATUS FOR COLLISION AVOIDANCE

(75) Inventor: Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 12/418,629

(22) Filed: Apr. 6, 2009

(65) Prior Publication Data

US 2010/0254403 A1 Oct. 7, 2010

(51) Int. Cl.
*H04L 12/413* (2006.01)

(52) U.S. Cl. ...................................... 370/445

(58) Field of Classification Search ............... 370/229, 370/445, 252, 389, 310, 474, 465, 447, 471, 370/392, 230, 235, 312, 468, 455, 431, 470
See application file for complete search history.

(56) References Cited

U.S. PATENT DOCUMENTS

| 7,535,879 | B2* | 5/2009 | Morioka et al. | 370/338 |
| 7,711,032 | B2* | 5/2010 | Diaz Fuente | 375/146 |
| 2002/0136183 | A1* | 9/2002 | Chen et al. | 370/338 |
| 2002/0159418 | A1* | 10/2002 | Rudnick et al. | 370/338 |
| 2003/0012160 | A1* | 1/2003 | Webster et al. | 370/335 |
| 2005/0153735 | A1 | 7/2005 | Morioka et al. | |
| 2005/0201361 | A1 | 9/2005 | Morioka et al. | |
| 2005/0232275 | A1 | 10/2005 | Stephens | |
| 2006/0023749 | A1* | 2/2006 | Yoshizawa et al. | 370/470 |
| 2007/0171933 | A1 | 7/2007 | Sammour et al. | |
| 2007/0248071 | A1 | 10/2007 | Hui et al. | |
| 2008/0062910 | A1* | 3/2008 | Matsui et al. | 370/315 |
| 2008/0107113 | A1 | 5/2008 | Wentink | |
| 2009/0252104 | A1* | 10/2009 | Zhang et al. | 370/329 |
| 2009/0279465 | A1* | 11/2009 | Hui et al. | 370/311 |
| 2010/0214169 | A1* | 8/2010 | Kafle | 342/368 |

FOREIGN PATENT DOCUMENTS

| EP | 1311095 A1 | 5/2003 |
| WO | 2007/081130 A1 | 7/2007 |
| WO | 2007/127240 A2 | 11/2007 |

OTHER PUBLICATIONS

Office Action Received for Chinese Patent Application No. 201010156466.2, Mailed on Mar. 29, 2012, 16 pages of Office Action including 9 pages of English translation.
International Preliminary Report on Patentability for PCT application PCT/US2D10/026606, mailed on Oct. 20, 2011.
IEEE Standard for Information technology—Local and metropolitan area networks—Specific requirements— Part 15.3: Wireless Medium Access Control (MAC) and Physical Layer (PHY) Specifications for High Rate Wireless Personal Area Networks (WPAN)—IEEE 802.15.3-2003.
International Search Report PCT application PCT/US2010/026606, mailed on Oct. 26, 2010.
Office Action Received for Korean Patent Application No. 2011-7026375, Mailed on Oct. 31, 2012, 5 pages Of translation of Office Action.
Office Action Received for Chinese Patent Application No. 201010156466.2, Mailed on Oct. 15, 2012, 22 pages.

* cited by examiner

*Primary Examiner* — Kwang B Yao
*Assistant Examiner* — Anh Ngoc Nguyen
(74) *Attorney, Agent, or Firm* — Shichrur & Co.

(57) ABSTRACT

A wireless communication device, a wireless communication system and a method of avoiding collisions by transmitting a packet length field before transmitting a header of the packet.

21 Claims, 3 Drawing Sheets

METHOD AND APPARATUS FOR COLLISION AVOIDANCE

BACKGROUND OF THE INVENTION

A personal wireless area network (WPAN) is a network used for communication among computing devices (for example, telephones and personal digital assistants) close to one person. The devices may or may not belong to the person in question. The reach of a WPAN may be a few meters. WPANs may be used for interpersonal communication among the personal devices themselves, or for connecting via an uplink to a higher level network and for example the Internet.

The IEEE 802.15.3 Task Group 3c (TG3c) was formed in March 2005. TG3c is developing a millimeter-wave (mmWawe) based alternative physical layer (PHY) for the existing 802.15.3 Wireless Personal Area Network (WPAN) Standard e.g., IEEE 802.15.3-2003. This mmWave WPAN may operate in a band including 57-64 GHz unlicensed band defined by FCC 47 CFR 15.255 and may be referred to as "60 GHz". The millimeter-wave WPAN may allow very high data rate (over 2 Gigabit per second (Gbps)) applications such as high speed Internet access, streaming content download (e.g., video on demand, high-definition television (HDTV), home theater, etc.), real time streaming and wireless data bus for cable replacement.

However, an mm Wave communication link is significantly less robust than those operating at lower frequencies (e.g. 2.4 GHz and 5 GHz bands) due to Friis transmission equation, oxygen absorption and high attenuation through obstructions. In addition, the mm Wave communication link may use a directional antenna and/or antennas array to increase the communication range. The use of a directional antenna makes a link very sensitive to mobility. For example, a slight change in the orientation of the device or the movement of a nearby object and/or person may disrupt the link. 60 GHz communication standards tend to have both orthogonal frequency-division multiplexing (OFDM) and single carrier (SC) physical layers. In some standards only one of the physical layers is mandatory, and in some other standards neither of OFDM and SC is mandatory. In a Carrier Sense Multiple Access (CSMA) communication scheme a device may determine the packet length according to information included in the packet header and may use this information in order to avoid collisions with other devices transmissions.

However, devices using SC may not be able to decode the packet length in a received OFDM packet and devices employing OFDM may not be able to decode the packet length and may try to transmit packets while other devices are transmitting, which may cause collisions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
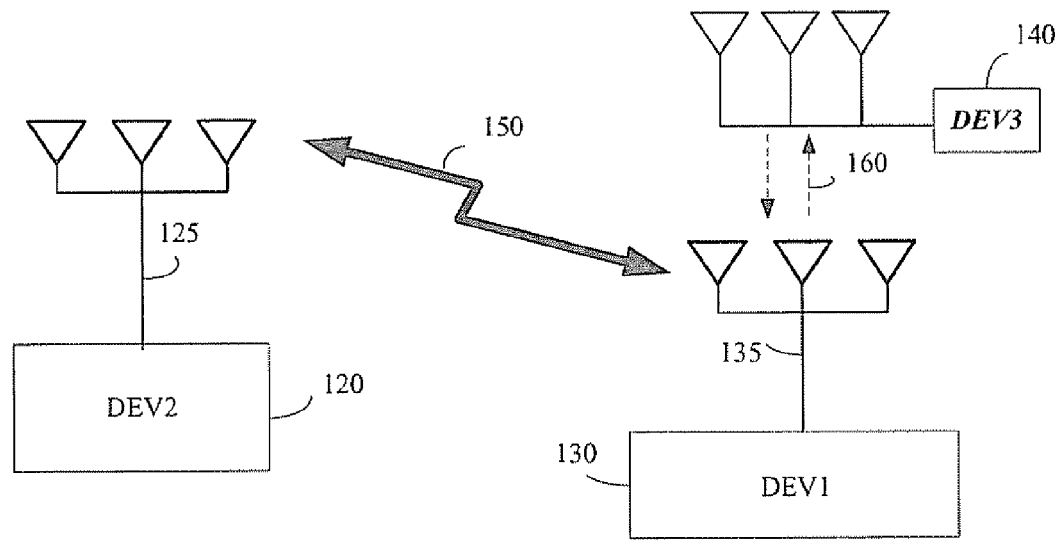
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known, methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein is defined as at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS). Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication network 100, according to exemplary embodiments of the invention is shown. According to exemplary embodiments of the present invention, wireless communication network 100 may be for example a WPAN. WPAN 100 may operate according for example, to the standard developing by the IEEE 802.15.3 Task Group 3c (TG3c). TG3c developing a millimeter-wave (mmWawe) based alternative physical layer (PHY) for the existing 802.15.3 Wireless Personal Area Network (WPAN) Standard 802.15.3-2003.

According to this exemplary embodiment of the invention, WPAN 100 may include stations 120, 130 and 140. Stations 120, 130 140 are depicted as devices (DEVs) e.g. DEV1, DEV2 and DEV3, respectively. Although the scope of the present invention is not limited in this respect, stations 120, 130 and 140 may include a camera, a mouse, an earphone, a speaker, a display, a mobile personal device or the like. Furthermore, each of DEV1, DEV2 and DEV3 may serve at and/or be a part of another WPAN, if desired.

According to this exemplary embodiment of the invention, DEV1 130 and DEV2 120 may transmit and receive OFDM signals via a direct link 150, if desired. DEV3 140 may send SC signals via for example, a direct link 160 to DEV1 160. DEV3 140 may send or provide a data packet to DEV1 130 that includes a packet length field. DEV3 140 and/or DEV2 120 and/or DEV1 130 may transmit the packet length field before a header of the packet. The packet length field may include a packet length in time units and the devices, in order to avoid collisions, may avoid, delay, or prevent transmission based on the decoded packet length.

According to at least one embodiment of the invention, the packet length field may be encoded in large units (e.g. micro seconds, OFDM symbols, SC blocks), and in a low rate modulation, which is simple and robust to decode. The packet length field may be decodable by both OFDM devices (e.g., DEV1 130 and DEV2 120) and SC devices (e.g., DEV3 140). Since the length of the packet may be encoded in large units, few bits may be needed to encode a long packet length for example, 10 bits for 1 ms, although the scope of the present invention is not limited to this exemplary embodiment of the invention.

Although the scope of the present invention is not limited in this respect, the packet length field may be modulated according to Biphase Shift Keying (BPSK) and spreading the modulated packet length field by a sequence selected from a Golay sequence, a maximum length sequence, a Walsh Hadamard sequence and a constant amplitude zero autocorrelation (CAZAC) sequence. For example, the encoding may be BPSK and/or quadrature phase shift keying (QPSK) with some spreading for example, spread by a 32 point Golay sequence or the like.

According to one exemplary embodiment of the invention, a robust modulation that may be decoded by the OFDM and SC devices may include encoding of the sequence with the QPSK, and then spreading with a 32 chips sequence, to enable 2 bits for every 32 chips, if desired. According to this exemplary embodiment the length required to encode 10 bits may be 160 SC chips, although the scope of the present invention is not limited in this respect.

Figure 2:
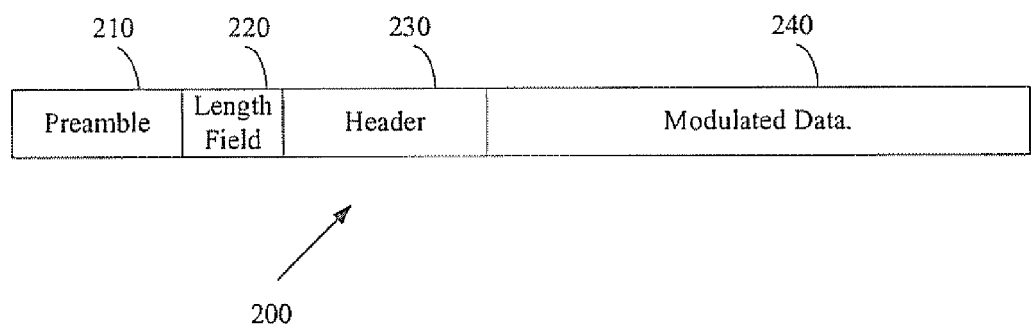
FIG. 2 is a schematic illustration of a packet according to exemplary embodiment of the invention.

Turning to FIG. 2, a schematic illustration of a packet 200 according to exemplary embodiment of the invention is shown. According to embodiments of the invention packet 200 may be a multiple carrier packet for example, OFDM and/or SC packet. According to one example embodiment, packet 200 may include a preamble 210, a length field 220, a header 230 and modulated data 240.

Figure 3:
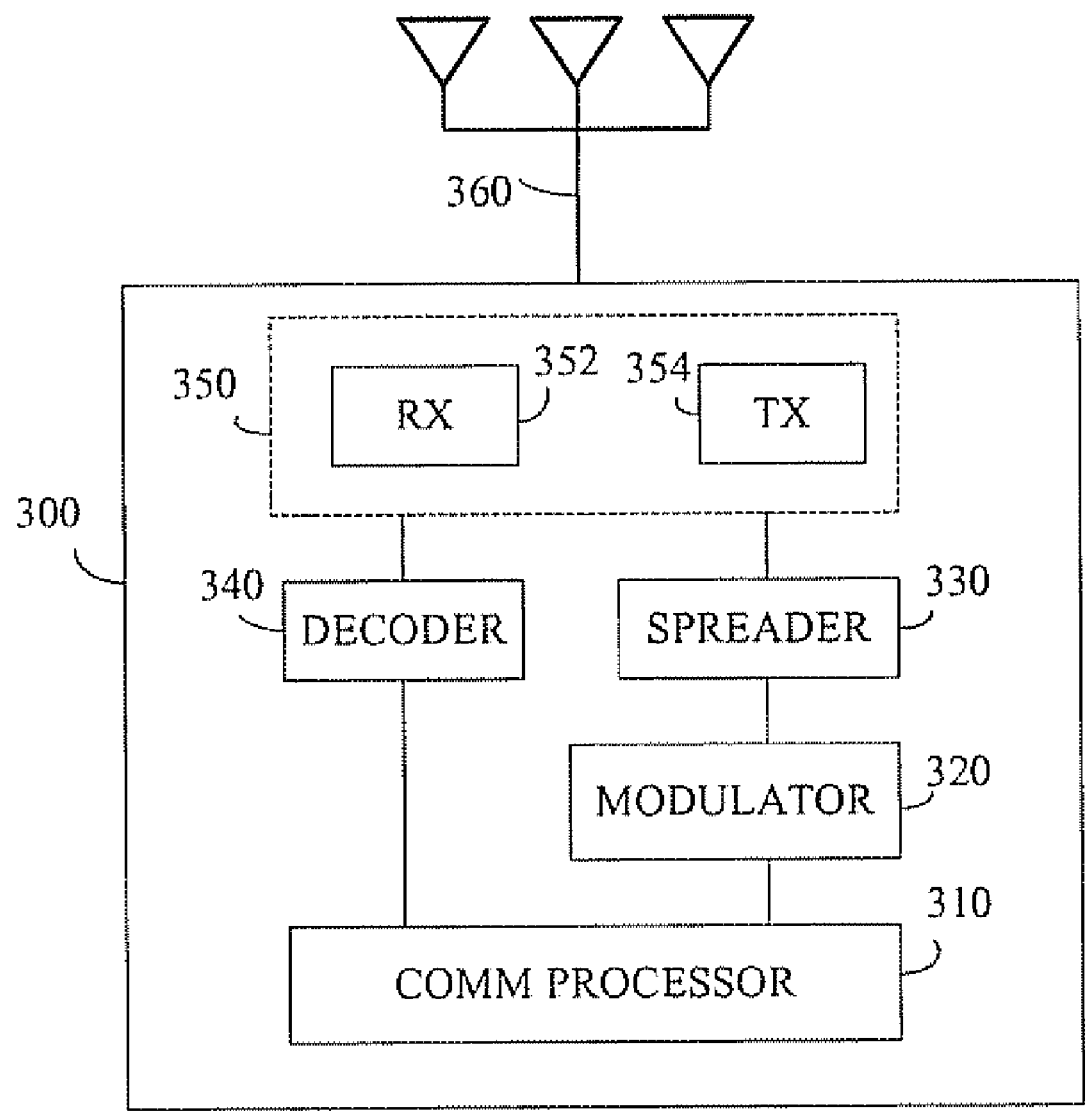
FIG. 3 is a block diagram of a wireless communication device according to some embodiments of the present invention.

Turning to FIG. 3 a block diagram of a wireless communication device according to some embodiments of the present invention is shown. According to this exemplary embodiment wireless communication device 300 may include a communication processor 310, a modulator 320, a spreader 330, a decoder 340, a multiple-input-multiple-output (MIMO) transmitters-receivers system 350 and a plurality of antennas 360. According to this example embodiment. MIMO transmitters-receivers system 350 may include at least one receiver (RX) 352 and at least one transmitter (TX) 354. Device 300 may operate as both SC device and/or OFDM device, if desired. It should be understood that is some embodiments of the invention, MIMO transmitters-receivers system 350 may include plurality of transmitters and plurality of receivers. However, not all the transmitters and/or receivers may be in operation, if desired.

Although the scope of the present invention is not limited in this respect, antennas 360 may include one or more antennas. Antennas 360 may include directional antennas, an antenna array, a dipole antenna or the like.

In operation, communication processor 310 may control wireless communication transmissions and avoid collisions with other devices transmission, if desired. For example, TX 354 may transmit a packet for example packet 200 which includes packet length field 220. TX 354 may transmit packet length field 220 before transmitting header 230. Packet length Held 220 may include a packet length in time units (for example, milliseconds, microseconds, seconds), although the scope of the present invention is not limited to this example.

According to one exemplary embodiment, modulator 320 may modulate packet length field 220 according BPSK and spreader 330 may spread the modulated packet length field by a sequence selected from a Golay sequence, a maximum length sequence, a Walsh Hadamard sequence and/or a constant amplitude zero autocorrelation (CAZAC) sequence, if desired. According to one other example embodiment, modulator 320 may modulate packet length field 220 according to QPSK and spreader 330 may spread the modulated packet length field by a Golay sequence, if desired.

TX 354 may able to transmit the header 230 in a physical (PHY) layer (e.g. also may depicted as a control PHY) which may be used for a beamforming and internal connection and in a lower modulation rate than the modulation rate in use for data transmission. For example, transmitting the header with BPSK modulation with spreading of 32 and coding rate of ¼ may be used, if desired. Another example is transmitting the header with BPSK modulation and coding rate of ½, if desired. It should be understood to one skilled in the art that TX 354 may able to transmit the packet (e.g., packet 200) according to a single carrier (SC) modulation scheme and/or according to multiple carriers modulation scheme e.g. OFDM, if desired.

According to exemplary embodiments of the invention. RX 352 may receive packet length field 220 either in single carrier or in multiple carriers, if desired. Decoder 340 may decode the packet length field information and communication processor 310 may avoid a start of transmission of TX 354 and/or MIMO receivers-transmitters system 350 based on the packet length information for the time indicated in the packet length field, although the scope of the present invention is not limited to this exemplary embodiment.

Figure 4:
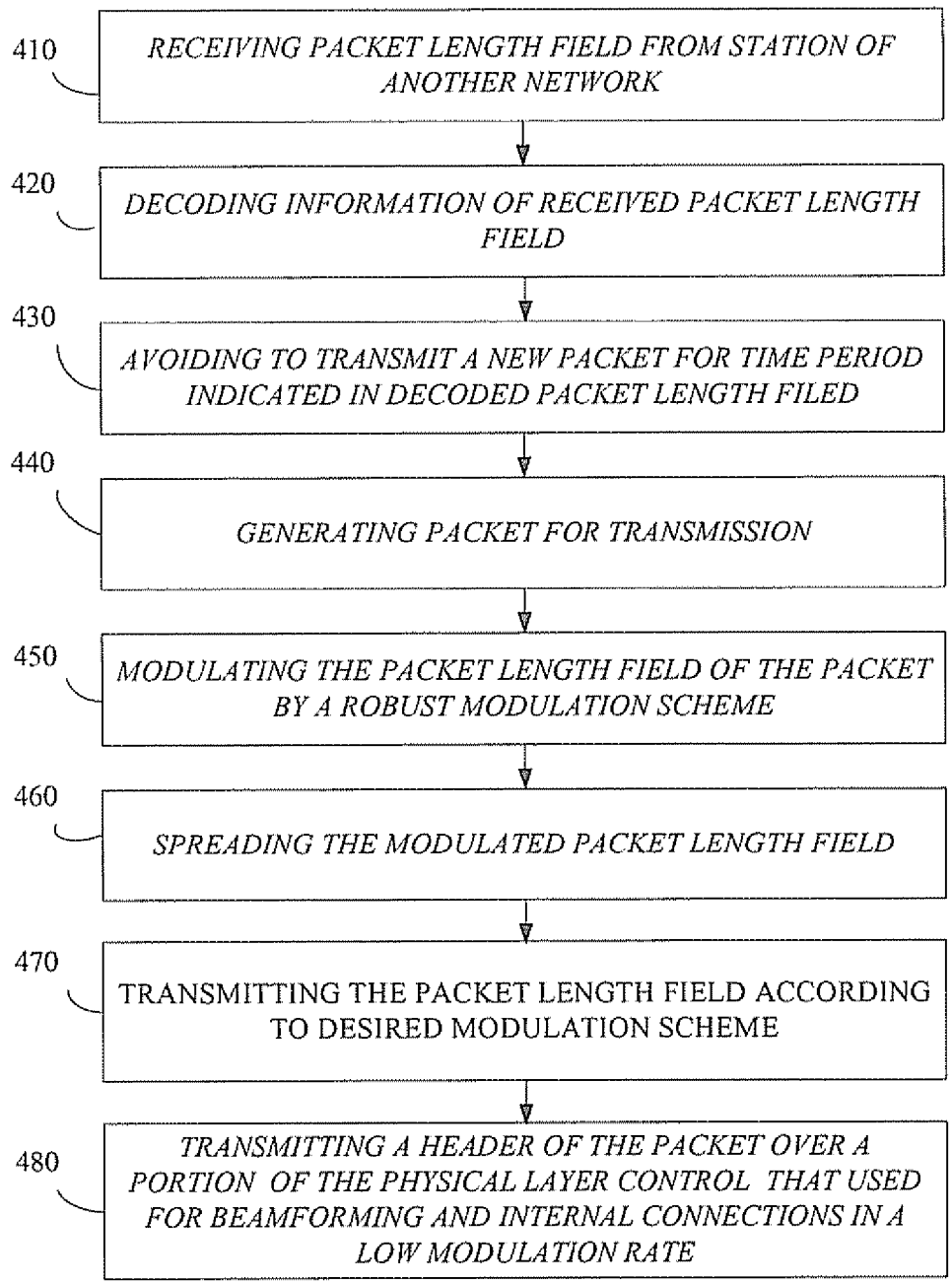
FIG. 4 is a flow chart of a method of avoiding collisions according to some embodiments of the invention.

FIG. 4 is a flow chart of a method of avoiding collisions according to some embodiments of the invention. According to an exemplary embodiment of the invention, the method may start with a station receiving a packet length field from a station of another network (text box 410). The station may receive the packet length field either in single carrier (SC) or in multiple carriers (e.g. OFDM), if desired. The station may decode the packet length field information (text box 420) and avoid a start of transmission based on the packet length information (text box 430). For example, the information of the packet length field may be time units and avoidance or delay of transmission may be for the time period indicated in the decoded packet length field, if desired.

According to some embodiments the station may generate a packet for transmission (text box 440). The station may modulate the packet length field by a robust modulation scheme (text box 450). For example, the station may modulate the packet length field acceding to BPSK and/or QPSK and may spread the modulated packet length field by a Golay sequence (text box 460). The station may transmit the packet length field according to a desired modulation scheme (text box 470). For example, the station may transmit the packet according to a single carrier (SC) modulation scheme and/or multiple carrier modulation scheme such as OFDM, if desired. The station may transmit the packet length field before transmitting a header of said packet. The station may transmit the header in a physical layer portion which may be used for a beamforming and internal connection and in a lower modulation rate than the modulation, rate which is used for data transmission (text box 480), although the scope of the present invention is not limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising: avoiding collisions by transmitting a packet length field of a wireless communication packet before transmitting a header of the packet in a Physical Layer (PHY), which is used for beamforming, wherein the packet length field includes a packet length of the packet encoded in a low rate modulation decodable by both multiple-carrier and Single Carrier (SC) receivers, and wherein the header is to be transmitted in the physical layer at a lower modulation rate than a modulation rate, which is used for data transmission.

2. The method of claim 1, wherein the packet length field includes the packet length of the packet in time units.

3. The method of claim 1, comprising: modulating the packet length field according to Biphase Shift Keying (BPSK); and spreading the modulated packet length field by a sequence selected from the group consisting of a Golay sequence, a maximum length sequence, a Walsh Hadamard sequence and a constant amplitude zero autocorrelation (CAZAC) sequence.

4. The method of claim 1, comprising: modulating the packet length field according to Quadrature Phase Shift Keying (QPSK); and spreading the modulated packet length field by a sequence selected from the group consisting of a Golay sequence, a maximum length sequence, a Walsh Hadamard sequence and a constant amplitude zero autocorrelation (CAZAC) sequence.

5. The method of claim 1 comprising:
transmitting the packet according to a SC modulation scheme.

6. The method of claim 1 comprising transmitting the packet according to a multiple carrier modulation scheme.

7. The method of claim 1 comprising transmitting the header of said packet immediately successive to said packet length field.

8. A wireless communication device comprising: a transmitter; and a communication processor to control the transmitter to transmit a packet length field of a wireless communication packet before transmitting a header of said packet in a physical layer (PHY), which is used for beamforming, for avoiding collisions based on the packet length, wherein the packet length field includes a packet length of the packet encoded in a low rate modulation decodable by both multiple-carrier and Single Carrier (SC) receivers, and wherein the header is to be transmitted in the physical layer at a lower modulation rate than a modulation rate, which is used for data transmission.

9. The wireless communication device of claim 8, wherein the packet length field comprises the packet length of the packet in time units.

10. The wireless communication device of claim 8, comprising: a modulator to modulate the packet length field according to Biphase Shift Keying (BPSK); and a spreader to spread the modulated packet length field by a sequence selected from the group consisting of a Golay sequence, a maximum length sequence, a Walsh Hadamard sequence and a constant amplitude zero autocorrelation (CAZAC) sequence.

11. The wireless communication device of claim 8, comprising: a modulator to modulate the packet length field according to Quadrature Phase Shift Keying (QPSK); and a spreader to spread the modulated packet length field by a sequence selected from the group consisting of a Golay sequence, a maximum length sequence, a Walsh Hadamard sequence and a constant amplitude zero autocorrelation (CAZAC) sequence.

12. The wireless communication device of claim 8, wherein the transmitter is able to transmit the packet according to a SC modulation scheme.

13. The wireless communication device of claim 8, wherein the transmitter is able to transmit the packet according to a multiple carrier modulation scheme.

14. The wireless communication device of claim 8, wherein said transmitter is to transmit said packet length field immediately successive to a preamble of said packet, and to transmit said header immediately successive to said packet length field.

15. A wireless communication system comprising at least one station, the station comprising: one or more antennas; and a transceiver to communicate a packet length field of a wireless communication packet before communicating a header of said packet in a Physical layer (PHY), which is used for beamforming, for avoiding collisions based on the packet length, wherein the packet length field includes a packet length of the packet encoded in a low rate modulation decodable by both multiple-carrier and Single Carrier (SC) receiver, and wherein the header is to be communicated in the physical layer at a lower modulation rate than a modulation rate, which is used for data transmission.

16. The wireless communication system of claim 15, wherein the packet length of the packet is in time units.

17. The wireless communication system of claim 15, wherein the station comprises: a modulator to modulate the packet length field according to Biphase Shift Keying (BPSK); and a spreader to spread the modulated packet length field by a sequence selected from the group consisting of a Golay sequence, a maximum length sequence, a Walsh Hadamard sequence and a constant amplitude zero autocorrelation (CAZAC) sequence.

18. The wireless communication system of claim 15, wherein the station comprises: a modulator to modulate the packet length field according to Quadrature Phase Shift Keying (QPSK); and a spreader to spread the modulated packet length field by a sequence selected from the group consisting of a Golay sequence, a maximum length sequence, a Walsh Hadamard sequence and a constant amplitude zero autocorrelation (CAZAC) sequence.

19. The wireless communication system of claim 15, wherein the transceiver is able to communicate the packet according to a SC modulation scheme.

20. The wireless communication system of claim 15, wherein the transceiver is able to communicate the packet according to a multiple carrier modulation scheme.

21. The wireless communication system of claim 15, wherein the transceiver comprises a receiver to receive said packet length field either in single carrier or in multiple carriers, and wherein the station comprises: a decoder to decode the packet length field information; and a communication processor to avoid a start of a transmission based on the packet length information.

* * * * *

UNITED STATES PATENT AND TRADEMARK OFFICE
CERTIFICATE OF CORRECTION

PATENT NO. : 8,369,351 B2  
APPLICATION NO. : 12/418629  
DATED : February 5, 2013  
INVENTOR(S) : Assaf Kasher Page 1 of 1

It is certified that error appears in the above-identified patent and that said Letters Patent is hereby corrected as shown below:

On the Title page, in item (56), in column 2, under "Other Publications", line 5, delete "PCT/US2D10/026606," and insert -- PCT/US2010/026606, --, therefor.

Signed and Sealed this  
Ninth Day of April, 2013

Teresa Stanek Rea  
*Acting Director of the United States Patent and Trademark Office*